(12) United States Patent
Ioffe (10) Patent No.: US 9,087,260 B1
(45) Date of Patent: Jul. 21, 2015

(54) HIERARCHICAL RANDOMIZED QUANTIZATION OF MULTI-DIMENSIONAL FEATURES

(75) Inventor: Sergey Ioffe, Mountain View, CA (US)

(73) Assignee: Google Inc., Mountain View, CA (US)

(*) Notice: Subject to any disclaimer, the term of this patent is extended or adjusted under 35 U.S.C. 154(b) by 645 days.

(21) Appl. No.: 13/342,781

(22) Filed: Jan. 3, 2012

(51) Int. Cl.
*G06K 9/36* (2006.01)
*H04N 1/44* (2006.01)

(52) U.S. Cl.
CPC . *G06K 9/36* (2013.01); *H04N 1/448* (2013.01)

(58) Field of Classification Search
None
See application file for complete search history.

(56) References Cited

U.S. PATENT DOCUMENTS

| | | | | |
|---|---|---|---|---|
| 4,734,767 | A * | 3/1988 | Kaneko et al. | 348/400.1 |
| 4,853,779 | A * | 8/1989 | Hammer et al. | 375/240.22 |
| 5,191,445 | A * | 3/1993 | Kurokawa et al. | 358/461 |
| 6,373,895 | B2 * | 4/2002 | Saunders et al. | 375/240.19 |
| 6,683,958 | B2 * | 1/2004 | Petrovic | 380/238 |
| 6,915,020 | B2 * | 7/2005 | Damera-Venkata et al. | 382/253 |
| 7,095,448 | B2 * | 8/2006 | Zhou et al. | 348/576 |
| 7,362,804 | B2 * | 4/2008 | Novotny et al. | 375/240.01 |
| 7,596,490 | B2 * | 9/2009 | Hotho et al. | 704/219 |
| 7,940,989 | B2 * | 5/2011 | Shi et al. | 382/232 |
| 7,949,224 | B2 * | 5/2011 | Green et al. | 386/239 |
| 8,032,754 | B2 * | 10/2011 | Mihcak et al. | 713/176 |
| 8,094,872 | B1 * | 1/2012 | Yagnik et al. | 382/100 |
| 8,363,889 | B2 * | 1/2013 | Guo et al. | 382/100 |
| 8,391,609 | B2 * | 3/2013 | Huntington et al. | 382/194 |
| 8,634,654 | B2 * | 1/2014 | van Zwol et al. | 382/203 |
| 2002/0001416 | A1 * | 1/2002 | Zhou et al. | 382/268 |
| 2002/0106104 | A1 * | 8/2002 | Brunk et al. | 382/100 |
| 2002/0136454 | A1 * | 9/2002 | Park et al. | 382/168 |
| 2002/0168011 | A1 * | 11/2002 | Bourge | 375/240.27 |
| 2002/0172429 | A1 * | 11/2002 | Boliek et al. | 382/240 |
| 2003/0059086 | A1 * | 3/2003 | Hayashi | 382/100 |
| 2003/0063747 | A1 * | 4/2003 | Petrovic | 380/238 |
| 2003/0147547 | A1 * | 8/2003 | Lin et al. | 382/100 |
| 2003/0169929 | A1 * | 9/2003 | Kohiyama et al. | 382/233 |
| 2003/0215111 | A1 * | 11/2003 | Zhang et al. | 382/100 |
| 2005/0091048 | A1 * | 4/2005 | Thyssen et al. | 704/223 |
| 2005/0154892 | A1 * | 7/2005 | Mihcak et al. | 713/176 |
| 2006/0023963 | A1 * | 2/2006 | Boliek et al. | 382/240 |
| 2006/0165174 | A1 * | 7/2006 | Bernard et al. | 375/240.16 |
| 2006/0233257 | A1 * | 10/2006 | Keith et al. | 375/240.19 |
| 2007/0027678 | A1 * | 2/2007 | Hotho et al. | 704/203 |
| 2007/0035427 | A1 * | 2/2007 | Schreier et al. | 341/143 |

(Continued)

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

(Continued)

*Primary Examiner* — Chan Park
*Assistant Examiner* — Mia M Thomas
(74) *Attorney, Agent, or Firm* — Amin, Turocy & Watson, LLP (57) ABSTRACT

Systems and methods for quantizing a local descriptor in video fingerprinting applications are provided. In one or more embodiments, local features of a video are extracted and characterized by a set of feature dimensions. The feature dimensions are then quantized to yield a quantized local descriptor for the video. To introduce a degree of pseudorandom variation in the quantization grids, a cascaded random quantization technique is employed to quantize the dimensions, wherein a quantized value for a given dimension is used to quantize a next dimension in sequence.

18 Claims, 9 Drawing Sheets

(56) References Cited

U.S. PATENT DOCUMENTS

| | | | |
|---|---|---|---|
| 2007/0280351 A1* | 12/2007 | Takamura et al. | 375/240.11 |
| 2008/0175509 A1* | 7/2008 | Wheeler et al. | 382/260 |
| 2008/0187042 A1* | 8/2008 | Jasinschi | 375/240.03 |
| 2009/0175331 A1* | 7/2009 | Karczewicz et al. | 375/240.03 |
| 2010/0215277 A1* | 8/2010 | Huntington et al. | 382/218 |
| 2010/0310157 A1* | 12/2010 | Kim et al. | 382/159 |
| 2011/0051807 A1* | 3/2011 | Liu et al. | 375/240.03 |
| 2011/0176618 A1* | 7/2011 | Stopler | 375/259 |
| 2011/0206113 A1* | 8/2011 | Bivolarsky et al. | 375/240.02 |

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

* cited by examiner

HIERARCHICAL RANDOMIZED QUANTIZATION OF MULTI-DIMENSIONAL FEATURES

TECHNICAL FIELD

This disclosure generally relates to video technology, and specifically to generation of local descriptors for video fingerprinting using cascading random quantization.

BACKGROUND

Video fingerprinting is sometimes used to generate a unique identifier for a video based on characteristics of the video's content. The resulting identifier can be used in video searching applications to locate a video based on its unique identifier, to match duplicate or near-duplicate copies of a given video, to identify unauthorized usage or ownership of copyrighted video material, or other such applications. To ensure reliable video matching, the video fingerprinting process should be designed to yield identifiers that are stable and invariant to video transformations such as cropping, scaling, image flipping, changes in perspective, or the like.

Some video fingerprinting processes generate unique identifiers by quantizing characteristics of the video's content. However, if the video's characteristics have been altered (e.g., by the aforementioned video transformations), the identifier generated for the altered video may not match the identifier generated for the original video. Local features having dimension values that reside near quantization grid boundaries are particularly susceptible to such video transformations, since relatively small changes may cause those values to quantize to a different integer value. Consequently, the resulting identifier has a higher likelihood of mismatching.

The above-described is merely intended to provide an overview of some of the challenges facing conventional systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of this disclosure relate to quantization of a local descriptor for a video using cascaded random quantization. To this end, a descriptor generation component can quantize dimensions of the local descriptor sequentially such that each dimension is mapped to a quantization grid generated based on previously quantized dimensions. Rather than employ fixed quantization grids to quantize the respective dimensions, a grid generation component can shift each grid in a pseudorandom manner based on quantized values of previously quantized dimensions of the local descriptor. Cascaded random quantization can introduce a degree of pseudorandom variation in the grids, thereby reducing the possibility of mismatching due to unstable areas of the video's feature space that lie near grid boundaries. Moreover, since the grids used to quantize features of a local descriptor are calculated based on quantized values of other features within the descriptor, similar features in different videos can be quantized using similar sets of grids despite the pseudorandom shifting, ensuring consistent quantization between similar videos.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Figure 1:
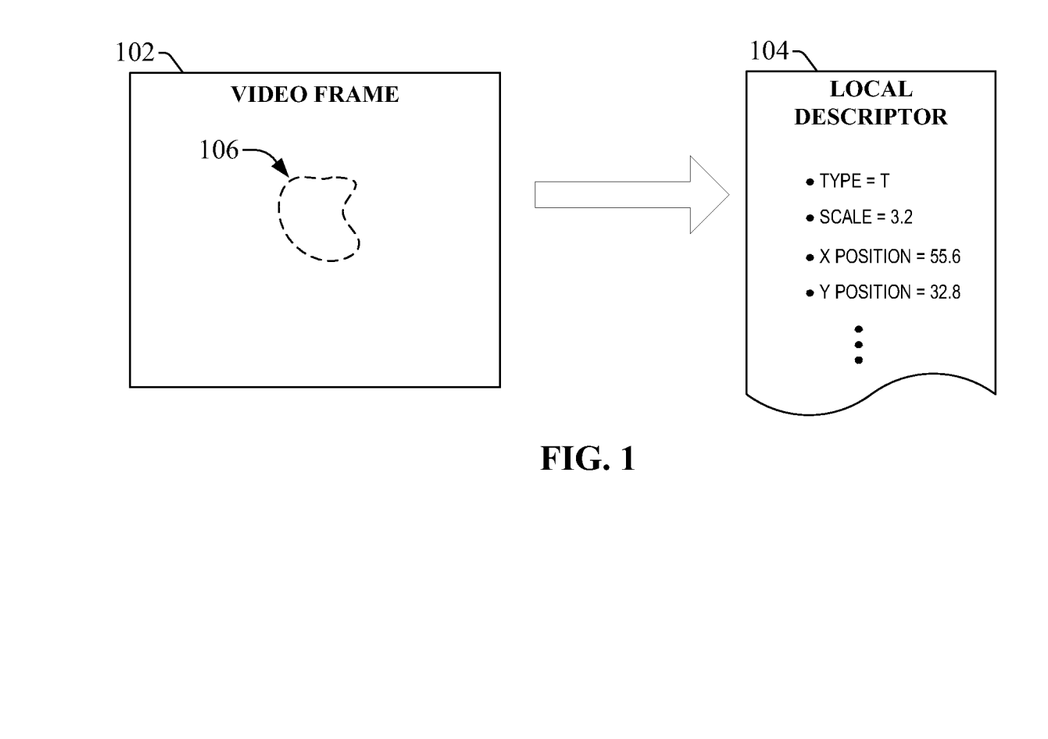
FIG. 1 illustrates creation of a local descriptor based on an interest point of a video frame.

Systems and methods described herein relate to generation of a local descriptor for a video using cascaded random quantization. Cascaded random quantization techniques can be employed, for example, in video fingerprinting applications that generate unique identifiers for videos for the purpose of video matching or identification. In an exemplary video fingerprinting application, one or more interest points within a video are identified, and a local descriptor is generated describing the interest points. An interest point can be, for example, a section of a frame having video characteristics that are easily identifiable and/or that are relatively invariant to video transformations (e.g., scaling, cropping, image flipping, perspective changes, alterations to aspect ratio, or other such video alterations). FIG. 1 illustrates creation of an exemplary local descriptor. In this example, interest point 106 has been identified within video frame 102. Interest point 106 can be selected based on any suitable criteria. For example, interest point 106 can represent a portion of video frame 102 comprising a dark area surrounded by light regions (or vice versa), an easily detectable transition in color (e.g., a sharp edge within an image), or the like.

Figure 2:
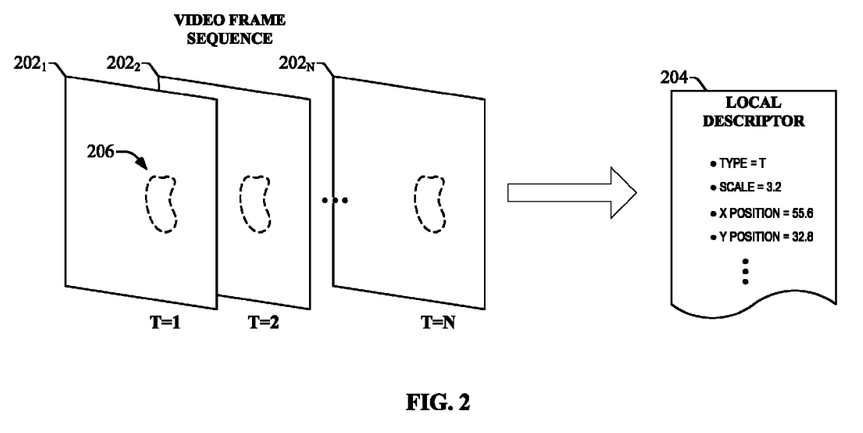
FIG. 2 illustrates creation of a local descriptor based on an interest point averaged over a sequence of video frames.

The interest point 106 can be described using a multi-dimensional local descriptor 104, which forms the basis of the unique identifier for the video. Any suitable set of dimensions can be included in the local descriptor, including type, scale, x-y position, etc. To make the identifier more discriminative, local descriptors can be generated for multiple interest points within the video frame 102. Descriptors can also be obtained based on video characteristics of video frame 102 as a whole rather than being limited to interest point 106. In some cases, the local descriptor can describe characteristics of a range of video frames (e.g., a video segment) rather than a single frame, as illustrated in FIG. 2. For example, the descriptive dimensions of interest point 206 can be averaged over frames $202_{1-N}$ (representing times T=1 through T=N, respectively), and the results can be encoded in local descriptor 204. Local descriptors that are associated with a range of video frames can include, as dimensions, the time range or frame identifiers associated with the series of frames $202_{1-N}$.

In some video fingerprinting applications, it is desirable to quantize the dimensions of the local descriptor to obtain integer values for the dimensions. In such cases, each dimension value can be mapped to a quantization grid that defines the quantization levels. Quantizing the local descriptor can compress the size of the descriptor, and can also place the local descriptor in a format suitable for hashing. The use of fixed quantization grids for the respective dimensions can compromise the reliability of the resulting identifier because of the instability of descriptor values that reside near quantization boundaries. In the fixed grid scenario, relatively small alterations to the video (or errors during extraction of the interest point features) can cause these unstable areas of the feature space to quantize to a different integer value, creating the possibility of video mismatches due to similar videos yielding different identifiers. The problems associated with fixed grid quantization can be mitigated using randomly generated grids for the respective dimensions. However, the use of purely random quantization grids can make consistent quantization difficult, since similar features in different videos may be quantized using different randomly generated grids, resulting in a false mismatch.

Figure 3:
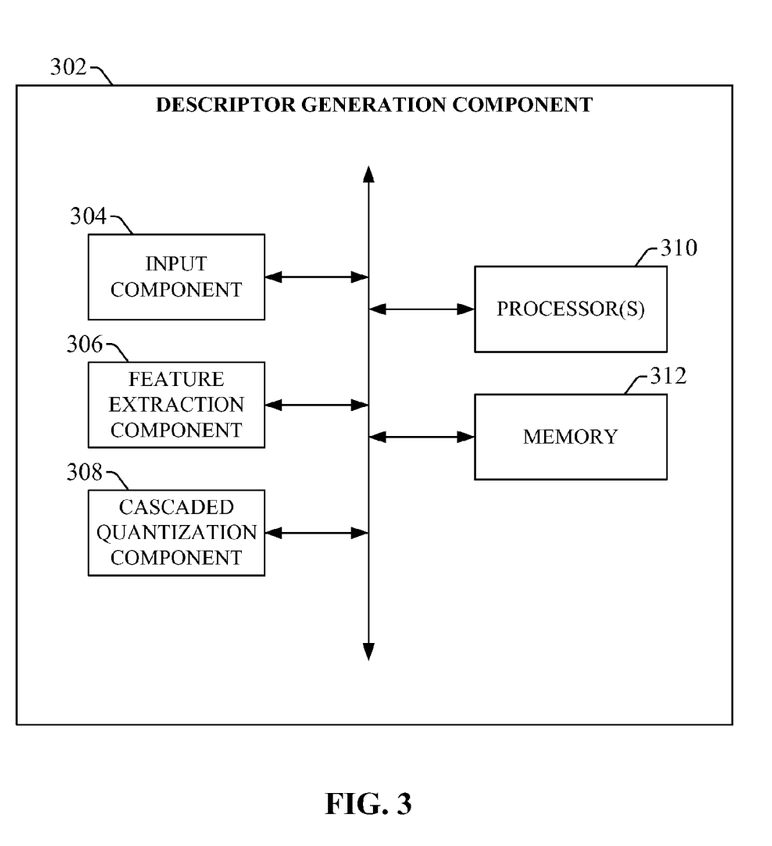
FIG. 3 illustrates a block diagram of an exemplary descriptor generation component that employs cascaded random quantization.

To mitigate these problems, one or more embodiments of this disclosure provide a descriptor generation component that employs cascaded random quantization techniques to yield variable yet repeatable quantization grids. FIG. 3 is a block diagram of an exemplary non-limiting descriptor generation component 302 that employs such quantization techniques. Descriptor generation component 302 can include an input component 304, a feature extraction component 306, a cascaded quantization component 308, one or more processors 310, and memory 312. In various embodiments, one or more of the input component 304, feature extraction component 306, cascaded quantization component 308, processor(s) 310, and memory 312 can be electrically and/or communicatively coupled to one another to perform one or more of the functions of the descriptor generation component 302.

Input component 304 can be configured to receive a video for which a descriptor is to be generated. Feature extraction component 306 can be configured to identify one or more interest points within one or more frames of the video and extract feature dimensions associated with the interest points. Cascaded quantization component 308 can be configured to quantize the extracted feature dimensions of the interest points to yield a quantized local descriptor for the video. In particular, cascaded quantization component 308 can apply cascaded random quantization to the feature dimensions, as will be described in more detail below. Processor(s) 310 can perform one or more of the functions described herein with reference to the systems and/or methods disclosed. Memory 312 can be a computer-readable storage medium storing computer-executable instructions and/or information for performing the functions described herein with reference to the systems and/or methods disclosed.

Figure 4:
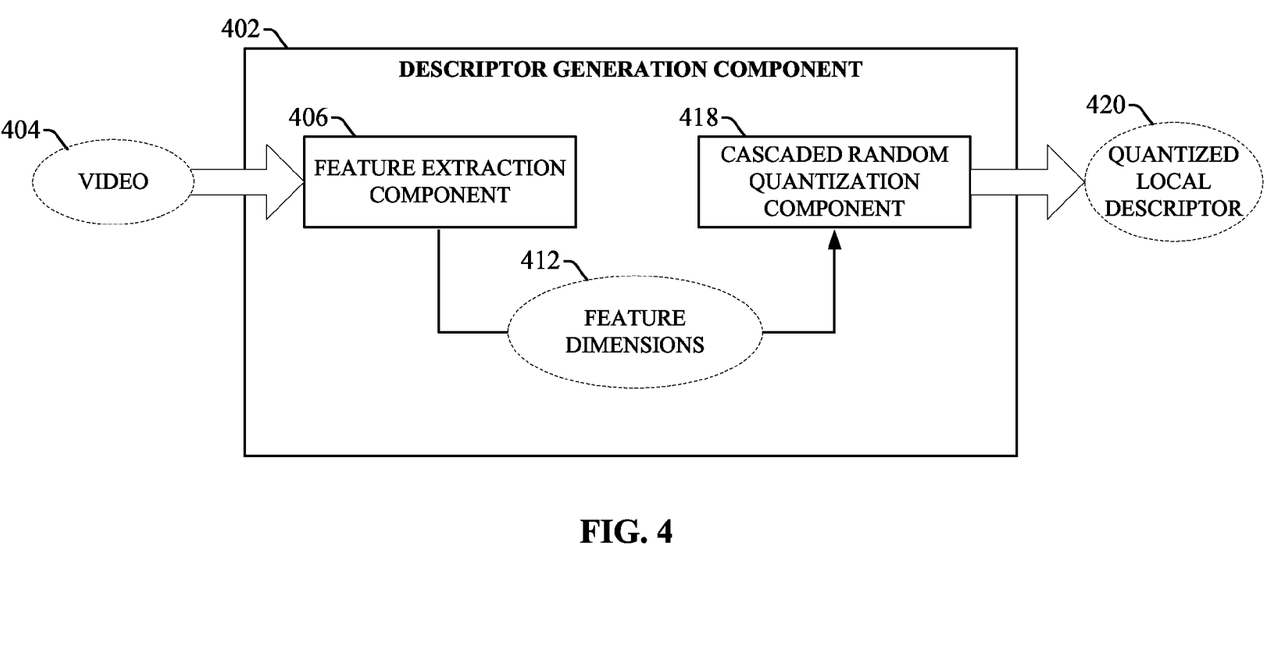
FIG. 4 illustrates creation of a quantized local descriptor for a video using a descriptor generation component that includes a cascaded random quantization component.

Characteristics of the descriptor generation component are described in more detail with reference to FIG. 4. Feature extraction component 406 of descriptor generation component 402 receives video 404 and identifies one or more interest points within one or more frames of the video 404 according to predetermined criteria. In some implementations, the interest points represent areas within the one or more frames determined to be easily identifiable (e.g., high-contrast edges, readily identifiable image objects, etc.). It is to be understood that the cascaded randomized quantization techniques described herein do not depend on the particular selection of interest points or the method used to select the interest points.

Upon identification of the interest points, feature extraction component 406 extracts a set of feature dimensions 412 that describe the identified interest points. These feature dimensions 412 make up the local descriptor that characterizes the interest points, and can include such dimensions as type, scale, x-y position, weight, or other such aspects. The feature dimensions 412 can also include features of an entire frame or sequence of frames of the video 404. In cases where the feature dimensions are generated for a sequence of frames, the feature extraction component 406 can average the values of the respective dimensions over the plurality of frames comprising the sequence. For example, if an interest point is a particular image within the video, the feature extraction component can measure the object's x-y position within each frame of the sequence and average the positions over the sequence. Feature extraction component 406 can then provide the resulting average x-position and average y-position as respective feature dimensions of the interest point. Feature extraction component 406 can also provide, as one of the feature dimensions 412, a time identifier or a frame identifier specifying a location within the video in which the interest point(s) can be found.

Feature extraction component 406 provides the feature dimensions 412 to the cascaded random quantization component 418, which quantizes the feature dimensions to yield a quantized local descriptor 420. Cascaded random quantization component 418 can quantize the feature dimensions by mapping the values to respective levels of a quantization grid, which renders the resulting descriptor more compact and places the descriptor in a format suitable for hashing. The quantized local descriptor 420 can serve as the basis for a unique identifier or fingerprint for the video 404 that can be used in video matching or video identification applications.

To reduce the possibility of mismatching due to inconsistent quantization of dimension values residing close to quantization grid boundaries, cascaded random quantization component 418 utilizes a sequential quantization technique that varies the grids used to quantize each dimension in a controlled and repeatable manner. In particular, cascaded random quantization component 418 quantizes the feature dimensions sequentially, such that the grid used to quantize each dimension is generated based on quantized dimensions calculated previously in the sequence. When a feature dimension in the sequence is quantized, the resulting quantized dimension and any other previously quantized dimensions in the sequence are used to determine the grid for the next dimension in the sequence.

Figure 5:
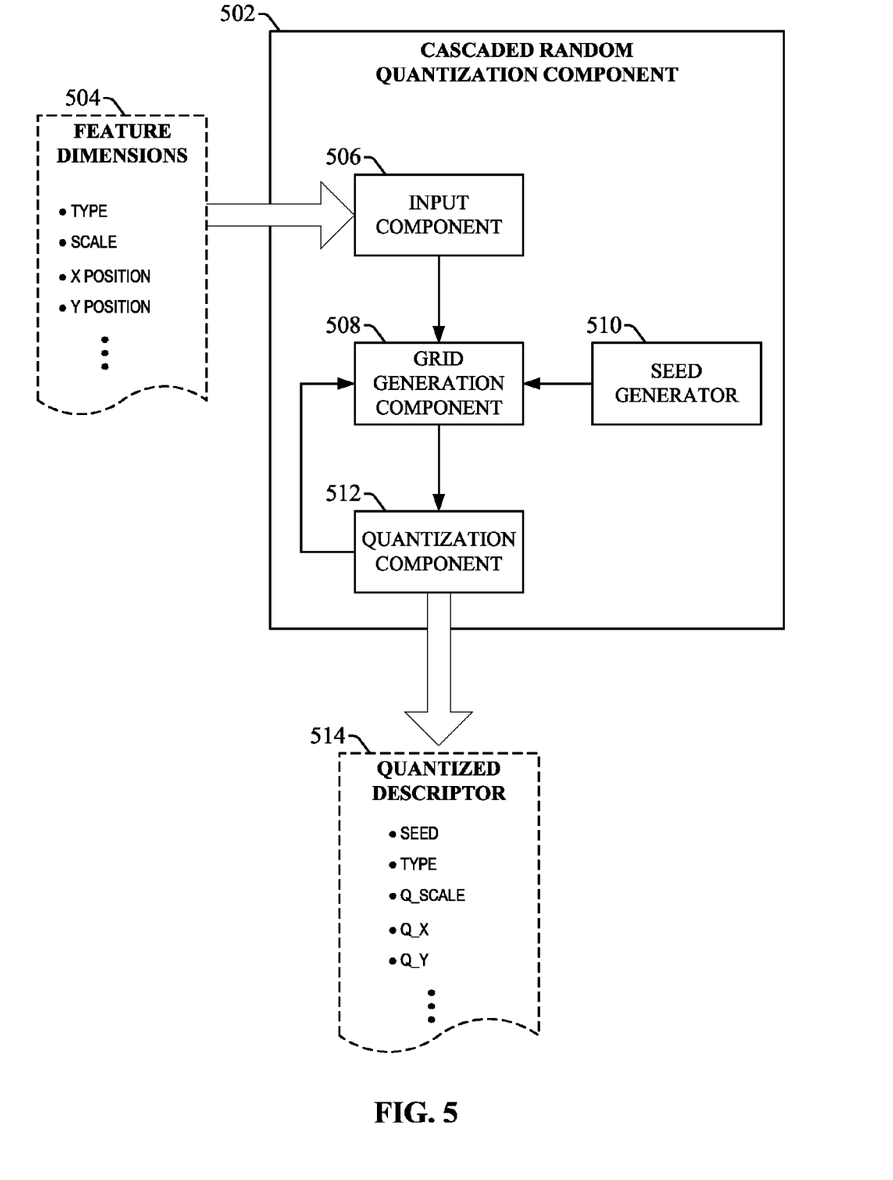
FIG. 5 is a block diagram of an exemplary cascaded random quantization component.

An exemplary cascaded random quantization component is described in more detail with reference to FIG. 5. Cascaded random quantization component 502 includes an input component 506, a grid generation component 508, a seed generator 510, and a quantization component 512. Input component 506 receives feature dimensions 504 (similar to feature dimensions 412 of FIG. 4). Feature dimensions 504 can include, for example, type, scale, x-position, y-position, or other representative characteristics of selected interest points. In one or more embodiments, input component 506 can obtain the feature dimensions 504 from a feature extraction component of a descriptor generation system (such as feature extraction component 406 of FIG. 4).

Input component 506 provides the feature dimensions to grid generation component 508, which generates the quantization grids used to quantize the respective dimensions. The grid generated for a given dimension by the grid generation component 508 is a function of a seed value provided by seed generator 510 and previously quantized dimensions of the feature set provided by quantization component 512. Thus, grid generation component 508 and quantization component 512 cooperate to sequentially quantize the feature dimensions 504 using grids that are varied in a pseudorandom manner.

To vary the grids, one or more embodiments of grid generation component 508 can include a random number generator (not shown) that outputs a random value between 0 and 1 based on an initialization tuple referred to hereafter as seeds. The random number can be represented as:

$$RND(seeds)$$

The tuple seeds can include at least the seed value provided by seed generator 510 and one or more quantized or non-quantized dimensions. Grid generation component 508 uses the random number RND(seeds) as a basis for the grids used to quantize the respective feature dimensions 504.

In a non-limiting example, consider an interest point or feature of a video represented by the feature dimensions [type, scale, x, y]. In the present example, the type dimension represents a type T of the interest point and does not require quantization. The dimensions scale, x, and y are values to be quantized. The grid generation component 508 creates an initial grid for quantizing the first dimension to be quantized (scale) based on a pseudorandom number initialized by a tuple comprising the seed value provided by seed generator 510 and the value of the type dimension:

$$RND(seed,type)$$

Assuming the scale dimension is to be quantized to a binary logarithmic grid, quantization component 512 quantizes the value of scale using the resulting grid as follows:

$$q\_scale=floor(lg(scale)+RND(seed,type))$$

where q_scale is the quantized value of scale. Note that the grid used to determine q_scale is shifted in a pseudorandom manner based on a seeds tuple comprising the seed value and the dimension type.

To quantize the next dimension in the sequence (x position), quantization component provides the quantized scale value q_scale to the grid generation component 508, which determines the next grid based on a new seeds tuple comprising the seed value, the type dimension, and the q_scale value. Assuming the x dimension is to be quantized based on multiples of 50, quantization component 512 can calculate the quantized value of x as:

$$q\_x=floor(x/50+RND(seed,type,q\_scale))$$

where q_x is the quantized value of x. Similarly, quantization component 512 provides the quantized value q_x to grid generation component 508 to determine the grid for quantizing the next dimension in the sequence. Accordingly, the y dimension is quantized as:

$$q\_y=floor(y/50+RND(seed,type,q\_scale,q\_x))$$

where q_y is the quantized value of y.

This sequential quantization process is continued until all dimensions of feature dimension 504 to be quantized have been quantized. Note that in the present example, the grid applied to the first dimension to be quantized (scale) is based on both the seed value and the type dimension (which is not quantized in the present example). However, it is to be appreciated that, in some scenarios, the first dimension in the sequence may be quantized to a grid determined based only on the seed value, with subsequent dimensions in the sequence quantized based on the seed and any previously quantized dimensions in the sequence.

After all the feature dimensions 504 to be quantized have been quantized, quantization component 512 can concatenate the quantized dimensions, any unquantized dimensions (e.g., type in the present example) and the seed value used to initialize the pseudorandom numbers to yield a quantized feature set:

$$quantized\ feature=[seed,type,q\_scale,q\_x,q\_y]$$

Cascaded random quantization component 502 can use this quantized feature as the basis for a quantized descriptor 514 for the video. Including the seed value within the quantized descriptor can allow a video matching application to perform meaningful comparisons between videos, since the seed informs the video matching application of the initialization value used to derive the quantized descriptor. Accordingly, the video matching application can generate a descriptor for a second video using the same seed and compare the results.

In the foregoing example, each feature dimension was quantized once, using one pseudorandomly generated grid for each dimension. However, to further reduce the possibility of mismatches due to inconsistent quantization, one or more embodiments of the cascaded random quantization component 502 can perform multiple quantizations on each dimension, such that each dimension is quantized using two or more different grids. To achieve these multiple quantizations, the cascaded random quantization component 502 can repeat the cascaded quantization process described above using a different seed for each run of the process. For example, if two quantizations are to be performed on feature dimensions 504, cascaded random quantization component 502 can perform the cascaded quantization process described above twice—a first time using seed value seed1, and a second time using seed value seed2. The resulting quantized feature can be represented as:

$$quantized\ feature=[seed1,type,q\_scale1,q\_x1,q\_y1, seed2,type,q\_scale2,q\_x2,q\_y2]$$

Cascaded random quantization component can then generate the quantized descriptor 514 based on these multiple quantizations.

The cascaded random quantization techniques described above can reduce or mitigate instances of fingerprint mismatching between similar videos due to quantization errors by varying the grids used to quantize the local feature dimensions. This can eliminate the unstable areas of the video's feature space that reside close to a fixed grid boundary, which are relatively susceptible to quantization errors, particularly if the video has been subjected to video processing (e.g., cropping, scaling, aspect ratio changes, etc.). Moreover, since the resulting quantized descriptor includes all the quantized dimensions together with the seed value used to generate the respective quantization grids, consistent quantization of similar features in different videos is more assured.

Figure 6:
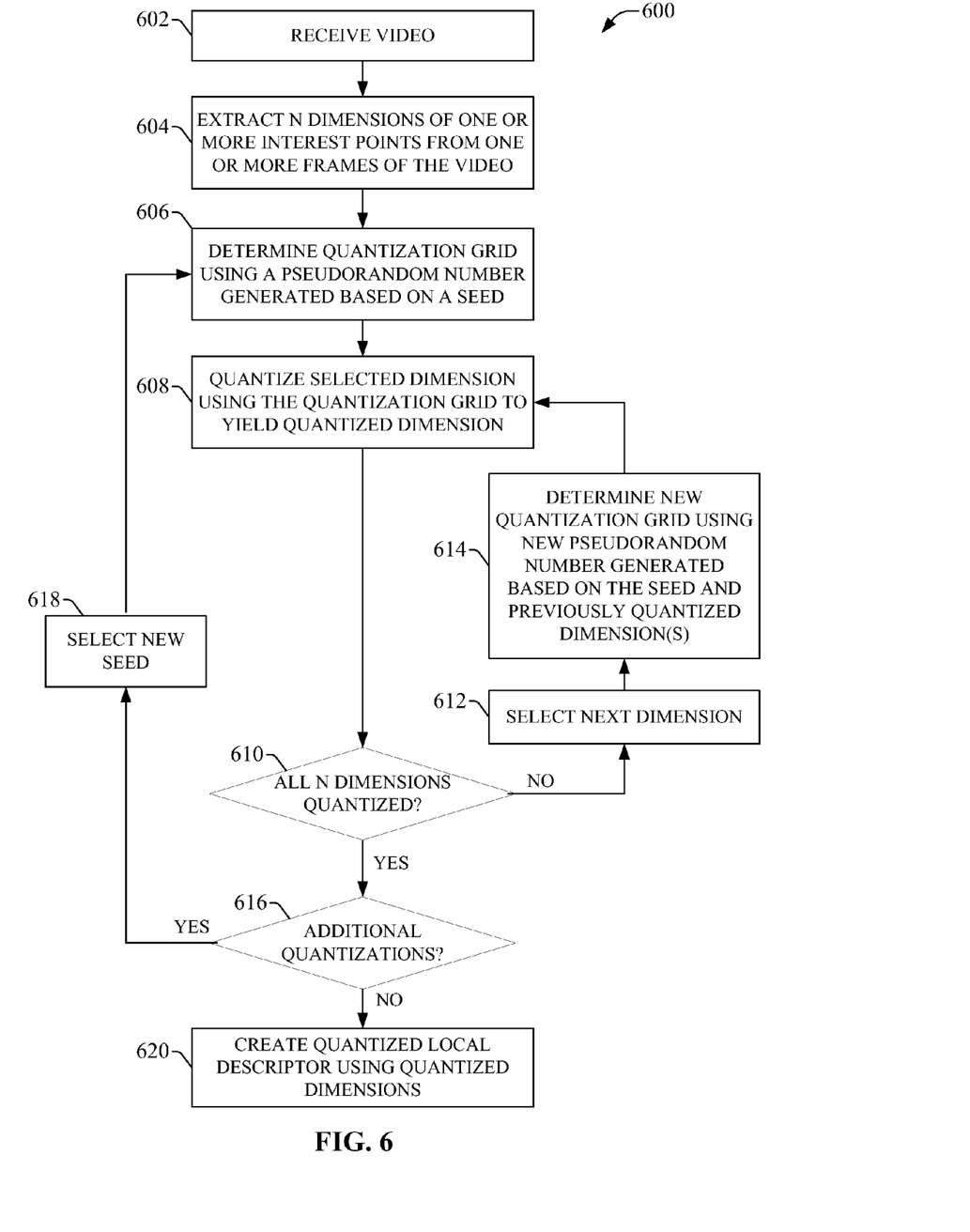
FIG. 6 is a flowchart of an example methodology for quantizing a set of local feature dimensions using cascaded random quantization.
Figure 7:
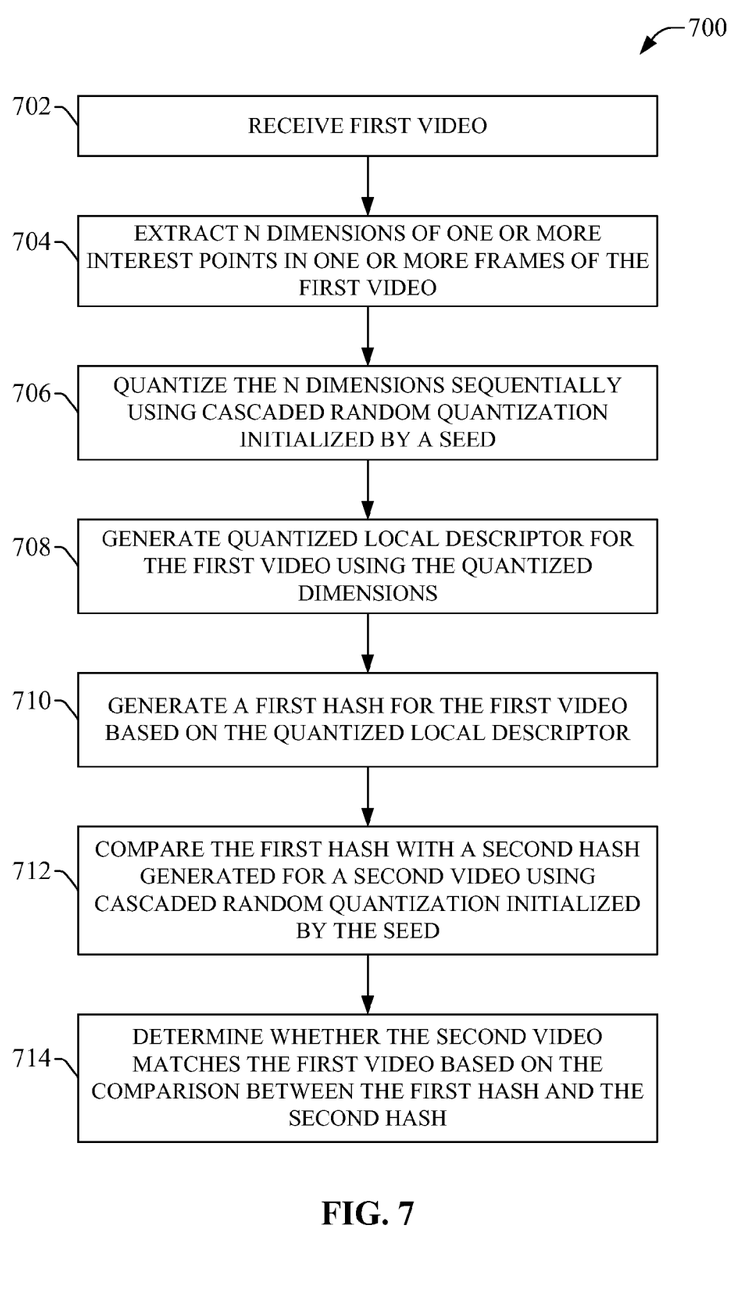
FIG. 7 is a flowchart of an example methodology for matching videos using local descriptors calculated using cascaded random quantization.

FIGS. 6-7 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 6 illustrates an example methodology 600 for quantizing a set of local feature dimensions using cascaded random quantization. At 602, a video is received (e.g., by input component 304) for which a local descriptor is to be generated. At 604, N dimensions of one or more interest points are extracted from one or more frames of the video (e.g., by feature extraction component 406). An interest point can be, for example, an area within a frame having easily identifiable characteristics and/or characteristics that are relatively invariant to video transformations (e.g., scaling, cropping, image flipping, perspective changes, alterations to aspect ratio, or other such modifications). An interest point can also be an image feature that is averaged over multiple frames of the video. However, it is to be appreciated that any suitable selection methodology can be used to identify the interest points, and the cascaded random quantization techniques describe herein are not dependent upon the particular selection of interest points.

At 606, a quantization grid is determined (e.g., by grid generation component 508) based on a pseudorandom number initialized by a seed. In one or more embodiments, the pseudorandom number is a value between 0 and 1, and is generated using a random number generator initialized by the seed. The seed can be a predetermined value, or can be a randomly or pseudorandomly generated number. The granularity of the grid can be chosen to suit the requirements of the application and/or the particular dimension being quantized, with the grid levels being shifted as a function of the pseudorandom number.

At 608, a selected dimension of the N dimensions is quantized (e.g., by quantization component 512) using the grid determined at step 606, yielding a quantized dimension. At 610, it is determined (e.g., by cascaded random quantization component 502) whether all N dimensions have been quantized. If all N dimensions have not been quantized, the method moves to step 612, where the next dimension of the N dimensions is selected. At 614, a new quantization grid is determined (e.g., by the grid generation component 508) using a new pseudorandom number generated based on a tuple comprising the seed and the quantized value determined at step 608. The method then returns to step 608, where the dimension selected at step 612 is quantized (e.g., by the quantization component 512) using the grid determined at step 614.

Steps 608-614 are repeated until all N dimensions have been quantized. Note that, in step 614, the grid used to quantize each dimension is determined based on the seed and all previously quantized dimensions in the sequence. For example, the grid used to quantize an Nth dimension is determined based on the seed and the N-1 previously quantized dimensions calculated by each previous performance of step 608. In the present example, when a dimension is quantized at step 608, the quantized value is added to the tuple used to determine the pseudorandom number employed at step 614 to calculate the next grid.

If it is determined at step 610 that all N dimensions have been quantized, in one embodiment, the method moves to step 616, where it is determined whether additional quantizations are to be performed on the N dimensions. Performing multiple quantizations can improve the reliability of subsequent descriptor matching by reducing or eliminating the instability associated with dimension values residing close to quantization grid boundaries. However, both single quantization and plural quantization embodiments are within the scope of certain embodiments of this disclosure.

If it is determined at step 616 that an additional quantization is to be performed, the method moves to step 618, where a new seed is selected (e.g., by seed generator 510). Steps 606-614 are then repeated for all N dimensions using the new seed to generate the grids at steps 606 and 614. Steps 606-618 can be repeated until the desired number of quantizations has been obtained for the N dimensions.

If no additional quantizations are to be performed, the method moves to step 620, where a quantized local descriptor is created (e.g., by cascaded random quantization component 502) for the video based on the quantized dimensions obtained by the previous steps. The quantized local descriptor can be used to uniquely identify the video, and can be suitable for use in video matching systems, detection of copyrighted video content, or other such applications.

FIG. 7 illustrates an example methodology 700 for matching videos using local descriptors calculated using cascaded random quantization. At 702, a first video is received (e.g., by input component 304). At 704, N dimensions of one or more interest points in the first video are extracted (e.g., by feature extraction component 406). At 706, the N dimensions are quantized sequentially (e.g., by cascaded random quantization component 502) using cascaded random quantization, using a methodology similar to that described in connection with FIG. 6. As described in previous examples, the cascaded random quantization can be initialized using a seed (e.g., provided by seed generator 510), which serves as a basis for pseudorandomly shifting the grids used to quantize the respective dimensions. If multiple quantizations are desired, the seed can be varied for multiple repetitions of step 706, such that each quantized value of a given dimension is a result of a different seed.

At 708, a quantized local descriptor is generated (e.g., by cascaded random quantization component 502) for the first video using the quantized dimensions obtained in step 706. In a non-limiting example, the quantized local descriptor can be generated by concatenating the quantized dimensions as well as the one or more seeds used to quantize the dimensions. At 710, a first hash is generated for the first video based on the quantized local descriptor. Any suitable hash function can be applied to the quantized values of the local descriptor to yield the first hash. At 712, the first hash is compared with a second hash generated for a second video. The second hash can be derived using method steps similar to those used to generate the first hash for the first video (e.g., steps 702-710). To ensure that a consistent comparison is being made between the two videos, the same seed used to create the quantized local descriptor and associated hash for the first video can be used to generate the hash for the second video. For example, if a video matching application is attempting to determine whether the first video matches the second video, the application can obtain the seed from the quantized local descriptor associated with the first video and generate a quantized local descriptor for the second video using the same seed. The second hash can then be derived based on the quantized local descriptor for the second video. At 714, a determination is made as to whether the second video matches the first video based on the comparison between the first hash and the second hash.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
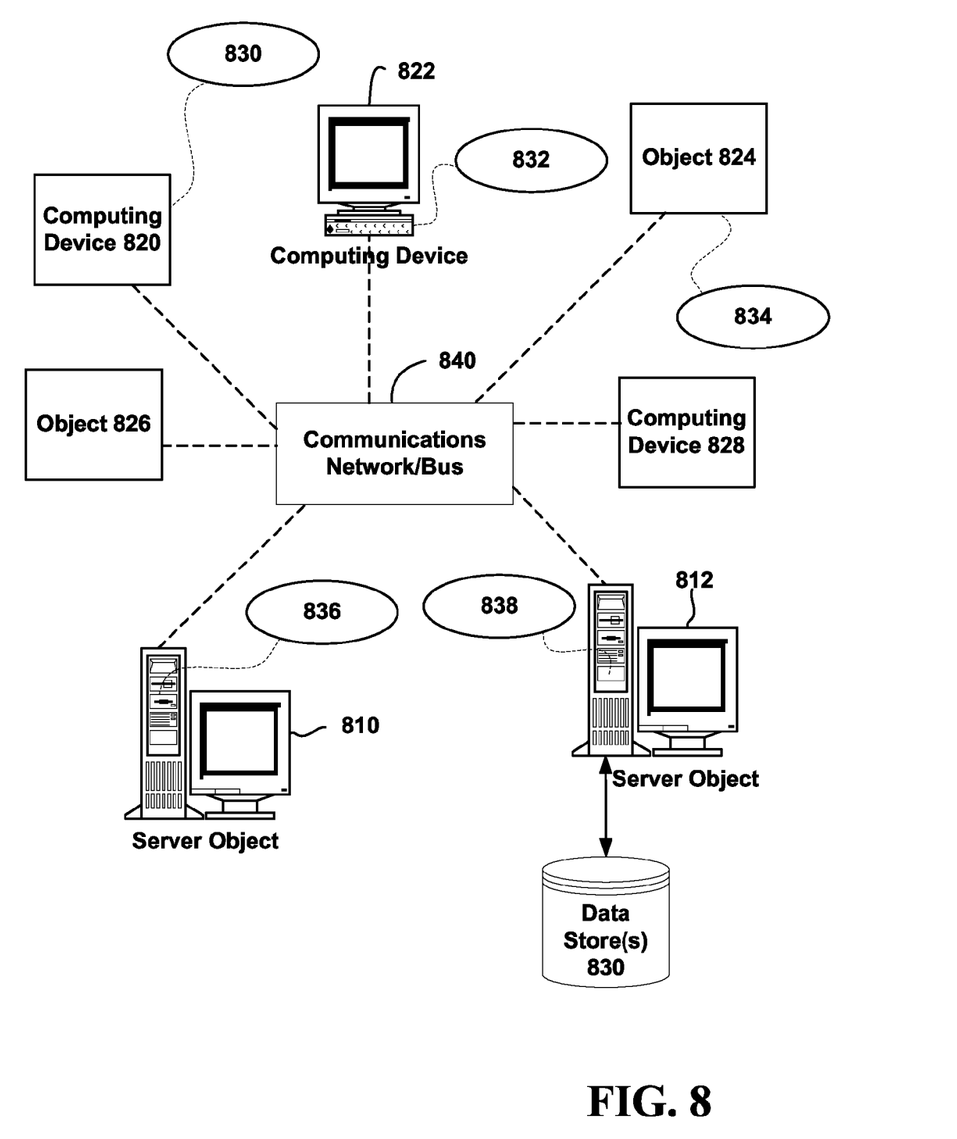
FIG. 8 is a block diagram representing an exemplary networked or distributed computing environment for implementing one or more embodiments described herein.

FIG. 8 provides a schematic diagram of an exemplary networked or distributed computing environment. The distributed computing environment includes computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing objects or devices 820, 822, 824, 1226, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1240 is the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Computing objects 810, 812, etc. may also serve as client computing objects or devices 820, 822, 824, 826, 828, etc., as may be characteristic of a distributed computing environment.

Exemplary Computing Device

Figure 9:
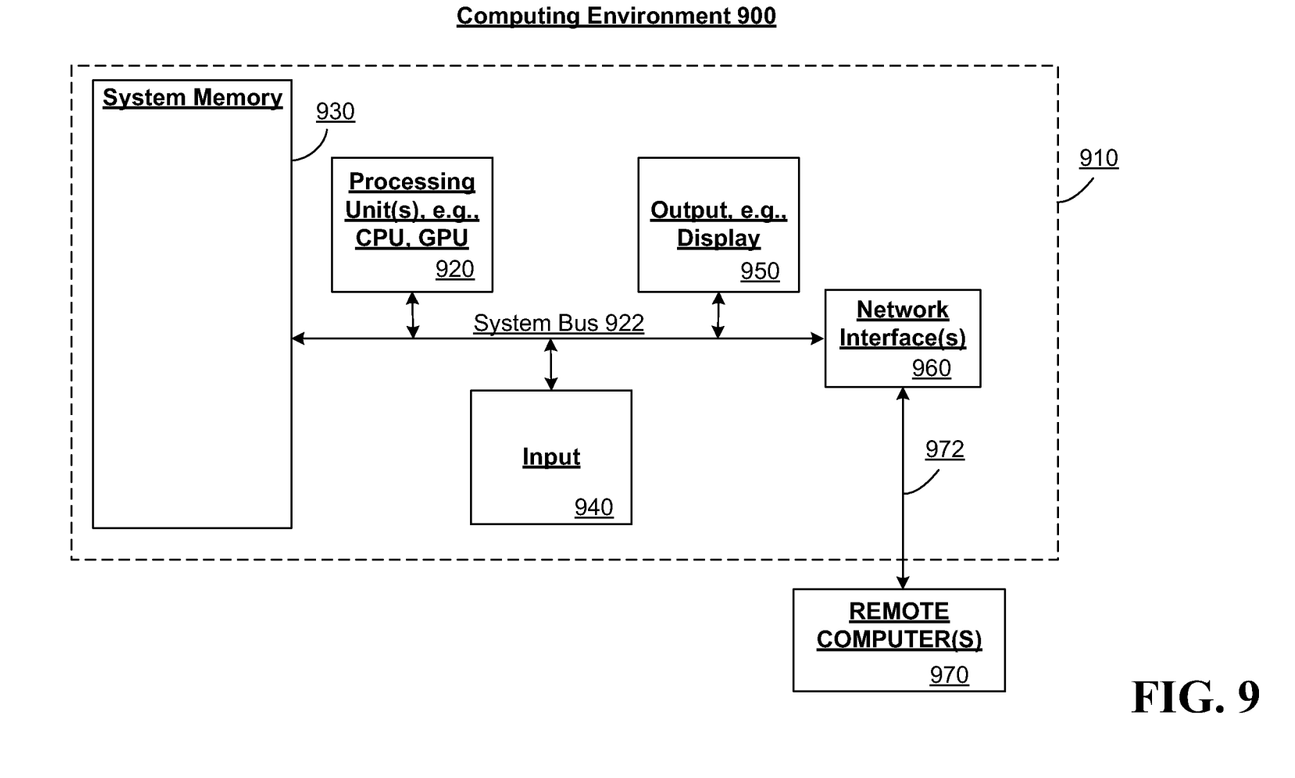
FIG. 9 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 9 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing system environment 900 be interpreted as having any dependency or requirement relating to any one or combination of components illustrated in the exemplary computing system environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring audio segments), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:
   calculating a first quantization grid as a function of a first pseudorandom number calculated based on a seed value;
   quantizing a first dimension of a descriptor in a fingerprint of a video using the first quantization grid to yield a first quantized value; and
   quantizing a second dimension of the descriptor using a second quantization grid calculated as a function of the first quantized value to yield a second quantized value.

2. The method of claim 1, further comprising: calculating the second quantization grid as a function of a second pseudorandom number calculated based on the seed value and the first quantized value.

3. The method of claim 2, further comprising: concatenating the first quantized value, the second quantized value, and the seed value to yield a quantized descriptor.

4. The method of claim 2, further comprising:
   calculating a third quantization grid as a function of a third pseudorandom number generated based on the seed value, the first quantized value, and the second quantized value;
   quantizing a third dimension of the descriptor using the third quantization grid to yield a third quantized value.

5. The method of claim 1, wherein the seed value is randomly generated.

6. The method of claim 1, further comprising: generating multiple quantized values for the first and second dimensions respectively using multiple seeds.

7. A system, comprising:
a memory; and
a processor that executes the following computer-executable components stored within the memory:
a feature extraction component configured to identify N dimensions of a descriptor in a fingerprint of a video, wherein N is an integer greater than 1; and
a quantization component configured to sequentially generate respective N quantized values for the N dimensions, wherein the quantization component quantizes an Mth dimension of the N dimensions using a quantization grid calculated as a function of previously generated quantized values of 1 to M−1 dimensions of the N dimensions, wherein M is an integer from 1 to N.

8. The system of claim 7, wherein the quantization component is further configured to calculate the quantization grid as a function of a pseudorandom number generated based on a seed value and the previously generated quantized values of the 1 to M−1 dimensions.

9. The system of claim 8, further comprising: a descriptor generation component configured to concatenate the N quantized values and the seed value to yield a quantized descriptor.

10. The system of claim 8, wherein the quantization component is further configured to generate multiple quantized values for at least one of the N dimensions by varying the seed value.

11. The system of claim 7, wherein the descriptor characterizes a video frame of the video.

12. The system of claim 7, wherein a dimension of the N dimensions includes one of a type, a scale, a position, or a time associated with the descriptor of the video.

13. A non-transitory computer-readable medium having stored thereon computer-executable instructions that, in response to execution, cause a system including a processor to perform operations, comprising:
calculating a first quantization grid as a function of a first pseudorandom number calculated based on a seed value;
quantizing a first dimension of a descriptor in a fingerprint of a video using a first quantization grid to yield a first quantized value; and
quantizing a second dimension of the descriptor using a second quantization grid calculated as a function of the first quantized value to yield a second quantized value.

14. The non-transitory computer-readable medium of claim 13, the operations further comprising: calculating the second quantization grid as a function of a second pseudorandom number calculated based on the seed value and the first quantized value.

15. The non-transitory computer-readable medium of claim 14, the operations further comprising:
calculating a third quantization grid as a function of a third pseudorandom number generated based on the seed value, the first quantized value, and the second quantized value;
quantizing a third dimension of the descriptor using the third quantization grid to yield a third quantized value.

16. The non-transitory computer-readable medium of claim 13, the operations further comprising: concatenating the first quantized value, the second quantized value, and the seed value to yield a quantized descriptor.

17. The non-transitory computer-readable medium of claim 13, wherein the descriptor is at least one interest point.

18. The non-transitory computer-readable medium of claim 13, the operations further comprising: generating multiple quantized values for the first and second dimensions respectively by using multiple seeds.

* * * * *